United States Patent
Goryavsky

(10) Patent No.: US 6,956,827 B2
(45) Date of Patent: Oct. 18, 2005

(54) DISTRIBUTION OF IDENTIFIERS IN SERVERLESS NETWORKS

(75) Inventor: Julius Goryavsky, Saint-Petersburg (RU)

(73) Assignee: Popular Telephony, Inc., Dover, DE (US)

( * ) Notice: Subject to any disclaimer, the term of this patent is extended or adjusted under 35 U.S.C. 154(b) by 17 days.

(21) Appl. No.: 10/801,291

(22) Filed: Mar. 15, 2004

(65) Prior Publication Data

US 2005/0036494 A1 Feb. 17, 2005

Related U.S. Application Data

(63) Continuation-in-part of application No. 10/641,821, filed on Aug. 15, 2003.

(51) Int. Cl.⁷ .............................................. H04L 12/28
(52) U.S. Cl. ...................... 370/255; 370/389; 370/395.3
(58) Field of Search ................................ 370/252, 254, 370/255, 352, 389, 392, 395.3, 395.32, 400, 401, 475

(56) References Cited

U.S. PATENT DOCUMENTS

| | | | | |
|---|---|---|---|---|
| 2002/0188657 A1 | * | 12/2002 | Traversat et al. | 709/201 |
| 2003/0061376 A1 | * | 3/2003 | Li et al. | 709/238 |
| 2003/0088673 A1 | * | 5/2003 | White et al. | 709/226 |
| 2004/0054807 A1 | * | 3/2004 | Harvey et al. | 709/243 |
| 2004/0156485 A1 | | 8/2004 | Poustchi et al. | |
| 2004/0249970 A1 | * | 12/2004 | Castro et al. | 709/238 |

* cited by examiner

*Primary Examiner*—Chi Pham
*Assistant Examiner*—Anh-Vu H Ly
(74) *Attorney, Agent, or Firm*—Donald R. Boys; Central Coast Patent Agency, Inc.

(57) ABSTRACT

A method for assigning identifiers in a distributed system involves establishing a circle as a locus of all identifiers, with the value of any point on the circle being the portion of one complete revolution in a first direction around the circle to the point, measured from a first zero point, and selecting values to be assigned as identifiers as needed by rounds of assignment, wherein the beginning and end of any round of assignment has identifiers assigned with point values that divide the circle into equal-length sectors. The method is useful in and applied to serverless telephony systems.

20 Claims, 7 Drawing Sheets

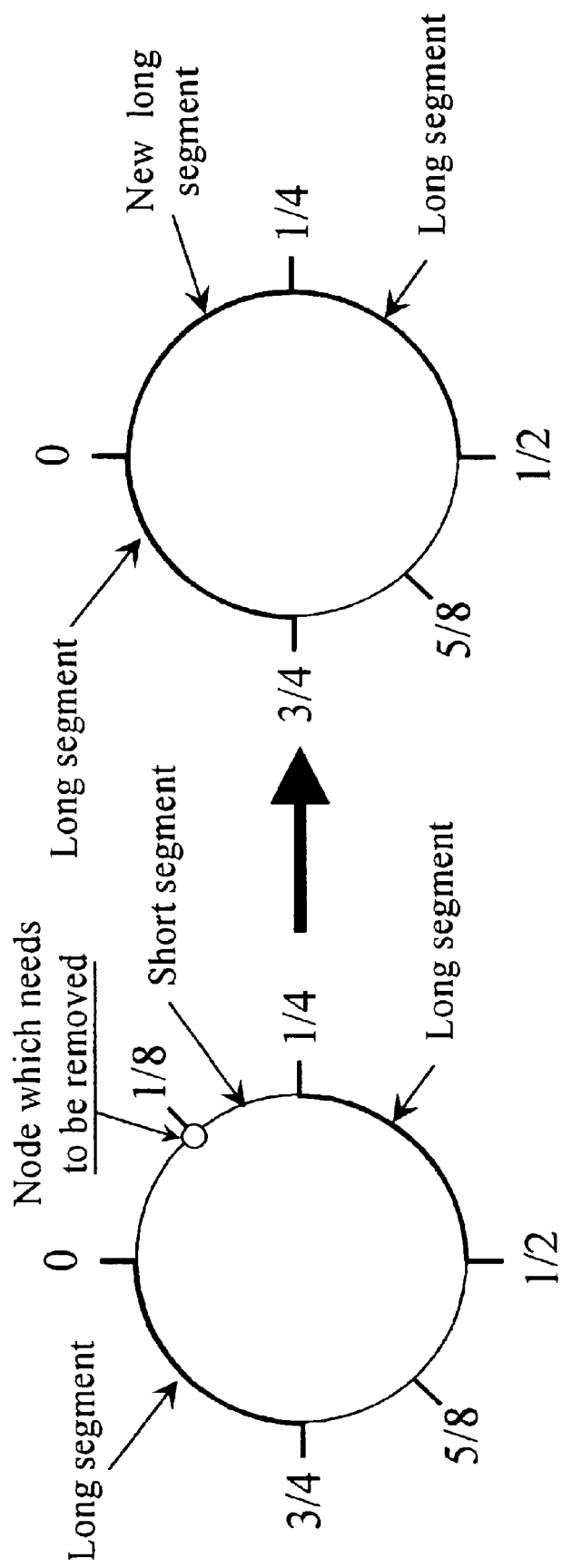

DISTRIBUTION OF IDENTIFIERS IN SERVERLESS NETWORKS

CROSS-REFERENCE TO RELATED DOCUMENTS

This present application is a continuation-in-part of, and claims priority to copending patent application Ser. No. 10/641,821, filed Aug. 15, 2003, titled "Serverless and Switchless Internet Protocol Telephony system and method". The entire disclosure of the priority document, including the appendix, is hereby incorporated by reference in its entirety.

FIELD OF THE INVENTION

The present invention relates to IP telephony systems generally and, more particularly to distribution of identifiers in an Internet Protocol (IP) Private Branch Exchange (PBX) system implemented without dedicated servers or switches.

BACKGROUND OF THE INVENTION

In serverless networks, such as in peer-to-peer systems, there is a need to assign unique identifiers to all network nodes in the system. The majority of serverless systems are based on a usage of distributed hash-tables (DHTs) to assign and track unique identifiers. Usage of DHTs toughens the requirements in serverless networks for node identifiers, because the identifiers should not only be unique, but also evenly (uniformly) distributed on all numerical axes or in n-dimensional space.

If node identifiers are not uniformly distributed on a numerical axis or in n-dimensional space, then some hashing functions in general will cease to work, others will lose their characteristics, and workload on individual network nodes may increase substantially, to the point of failure. At least part of the reason for such difficulties with non-uniform allocation of identifiers, is that memory requirements and/or throughput at one or more individual nodes may become unacceptably large, and/or network search time may suffer.

Substantially uniform allocation of identifiers is therefore a critical condition for effective operation of all distributed hashing functions known at present to be used in assigning and tracking network node identifiers. The advantages, known to the skilled artisan, of the use of distributed hash-tables in conjunction with other methods, for construction of peer-to-peer networks are only attained when the node identifiers are allocated substantially uniformly.

When dealing with a distributed serverless network system having a relatively large number of independent nodes, such as thousands or even millions of independent nodes, for the practical assignment of node identifiers classical cryptographic hashing functions such as MD5 or SHA-1 (known to the skilled artisan) working simultaneously may be used. With the help of such hashing functions it is possible, for example, to convert a combination of the user name, the MAC-address of a network card, the IP-address of a node or other data, which is unique for each site on the network, and to create thereby a numerical identifier for the node. With a high probability (O ($\frac{1}{2}$^n) where "n" is a number of sites in a network), these identifiers will evenly fill themselves in a numerical axis such that the length of the biggest interval between identifiers will not differ greatly from the length of the smallest.

If, on the other hand, the number of nodes in a serverless network is relatively small, tens or even hundreds for example, then the probability of non-uniform identifier allocation is unacceptably large for construction of a reliable system.

For construction of relatively small peer-to-peer networks, such as, for example, networks intended for use within a corporate structure or for a cluster system, it is necessary to develop an allocation system for node identifiers that will guarantee both uniqueness and substantially uniform distribution across all numerical axes without dependence on the number of nodes which have entered the network.

Such a system for node identifier allocation should be resistant against failures (fault resistant). If certain arbitrarily-selected network nodes fail, the failures should not create bottlenecks. Further, introduction of any quantity of new nodes into a network, including the introduction of several nodes simultaneously, should not create excessive load on any network node. That is, load balancing should be an inherent feature of such a system. Thus it should be possible to connect nodes in parallel to a network (many nodes simultaneously), instead of strictly sequentially.

A system with the desirable features described above has uses beyond node identifier assignment in peer-to-peer networks. Such a system and method may be used, for example, for uniform allocation of any identifiers and numerical values in a distributed system. It can be identifiers of special nodes of the defined kind, resource identifiers placed on network nodes, or any other identifiers and numerical values, which should be evenly distributed on a numerical axis.

SUMMARY OF THE INVENTION

In a preferred embodiment of the present invention a method for assigning identifiers in a distributed system is provided, comprising (a) establishing a circle as a locus of all identifiers, with the value of any point on the circle being the portion of one complete revolution in a first direction around the circle to the point, measured from a first zero point; and (b) selecting values to be assigned as identifiers as needed by rounds of assignment, wherein the beginning and end of any round of assignment has identifiers assigned with point values that divide the circle into equal-length sectors.

In some embodiments, in any round of assignment, beginning with n equal-length sectors, termed long sectors, only the value of midpoints of long sectors are selected as identifiers to be assigned in the system, creating with each new assignment two new short sectors, the round continuing until all long sectors are divided making the number of sectors at the end of the round, and the beginning of the next round 2n. Also in some embodiments in every ascending new round of execution the short sectors at the end of the previous round are considered to be long sectors at the beginning of the next round, the number of sectors increasing in each round by a factor of two.

Further in some embodiments of the method identifiers may be withdrawn arbitrarily in any round as well as assigned, and if an identifier withdrawn is an endpoint of an undivided long sector, an already-assigned identifier in that round having a value of a midpoint of a long sector is reassigned using the value of the withdrawn identifier, freeing the previous midpoint value to be reused. In some cases, if in any instant round withdrawal of an identifier will reduce the number of sectors below the beginning number of sectors for the round, a new descending round is entered wherein the long sectors of the instant round are considered short sectors of the descending round.

Also in some embodiments of the method a bitmap convention is used in any round for identifying, at any point in time, which long sectors are divided into short sectors by assignment of identifiers, and which are not, the number of bits in the main bitmap equal to the number of long sectors in the round. In some cases main bitmap is divided into equal-length fragments, each fragment representing a group of adjacent sectors of the circle. The segment length may preferably be a power of two. In embodiments the main bitmap is consulted in selecting sectors for assigning and reassigning identifiers.

In some embodiments using bitmaps a hierarchy of bitmap fragments is established over the main bitmap, one bit in each upper-level bitmap representing a bitmap fragment in the next lower-level bitmap, wherein a one in a bit of an upper-level bit indicates either presence of at least one undivided sector or at least one divided sector represented in the associated lower-level fragment. In some embodiments the hierarchy of bitmaps is used to select sectors to divide to provide values for assignment as identifiers or assigned values to be re-assigned.

In another aspect of the invention a method for selecting a bit of a main bitmap for an operation is provided, comprising steps of (a) dividing the bitmap into a series of fragments; and (b) creating a first hierarchy of bit-map fragments in ascending levels, wherein each bit in a higher-level bitmap is associated with a multi-bit fragment of a lower-level bitmap, and wherein a one in a bit of a higher-level bitmap indicates at least one value of one in the associated lower-level fragment.

In some embodiments of this method there may be a second hierarchy of bitmap fragments in ascending levels, wherein each bit in a higher-level bitmap is associated with a multi-bit fragment of a lower-level bitmap, and wherein a one in a bit of a higher-level bitmap indicates at least one value of zero in the associated lower-level fragment. Also in some embodiments bits of the main bitmap represent sectors of a circle, and the circle is the locus of all points having values to be assigned as indentifiers in a distributed system. Further in some embodiments bits of the main bitmap represent sectors of a circle, and the circle is the locus of all points to be assigned as indentifiers in a distributed system, and wherein a system managing assignment of identifiers in a distributed system enters one of the first and second hierarchies at the highest level, and follows bit indicators through the hierarchy to select a bit in the main bitmap indicating availability of an identifier to be assigned or re-assigned in the distributed system.

Still further in some embodiments of this method the distributed system is a serverless telephony system comprising computerized appliances as nodes in the distributed network. Further still, one or both of fragments of the main bitmap and portions of the system managing assignment of identifiers may be stored and operable on individual ones of active nodes in the serverless system.

In yet another aspect of the invention a distributed, serverless system is provided, comprising a plurality of computerized appliances as active and inactive nodes in the serverless system, a communication facility interconnecting individual ones of the plurality of computerized appliances, and an assignment system for assigning and re-assigning identifiers to nodes of the serverless system. The assignment system establishes a circle as a locus of all identifiers, with the value of any point on the circle being the portion of one complete revolution in a first direction around the circle to the point, measured from a first zero point, and selects values to be assigned as identifiers as needed by rounds of assignment, wherein the beginning and end of any round of assignment has identifiers assigned with point values that divide the circle into equal-length sectors.

In some embodiments of the system, in any round of assignment, beginning with n equal-length sectors, termed long sectors, only the value of midpoints of long sectors are selected as identifiers to be assigned in the system, creating with each new assignment two new short sectors, the round continuing until all long sectors are divided making the number of sectors at the end of the round, and the beginning of the next round 2n. Also in some embodiments in every ascending new round of execution the short sectors at the end of the previous round are considered to be long sectors at the beginning of the next round, the number of sectors increasing in each round by a factor of two.

In some embodiments of this system identifiers may be withdrawn arbitrarily in any round as well as assigned, and if an identifier withdrawn is an endpoint of an undivided long sector, an already-assigned identifier in that round having a value of a midpoint of a long sector is reassigned using the value of the withdrawn identifier, freeing the previous midpoint value to be reused. Further in some embodiments, if in any instant round withdrawal of an identifier will reduce the number of sectors below the beginning number of sectors for the round, a new descending round is entered wherein the long sectors of the instant round are considered short sectors of the descending round. In some embodiments a bitmap convention is used in any round for identifying, at any point in time, which long sectors are divided into short sectors by assignment of identifiers, and which are not, the number of bits in the main bitmap equal to the number of long sectors in the round.

In yet other embodiments of the invention the main bitmap is divided into equal-length fragments, each fragment representing a group of adjacent sectors of the circle. In some preferred cases the segment length is a power of two. In many embodiments the main bitmap is consulted in selecting sectors for assigning and reassigning identifiers.

In some embodiments using bitmaps a hierarchy of bitmap fragments is established over the main bitmap, one bit in each upper-level bitmap representing a bitmap fragment in the next lower-level bitmap, wherein a one in a bit of an upper-level bit indicates either presence of at least one undivided sector or at least one divided sector represented in the associated lower-level fragment. In some cases the hierarchy of bitmaps is used to select sectors to divide to provide values for assignment as identifiers or assigned values to be re-assigned.

In embodiments of the invention described in enabling detail below, for the first time a means is provided to assign and release identifiers in a serverless system, that is quick, makes relatively low demands on computer resources, and ensures that the numerical distance between any two identifiers is never more than twice the distance between any other two identifiers.

BRIEF DESCRIPTION OF THE DRAWING FIGURES

FIG. 3a is a diagram illustrating a node to be deleted from a network in an embodiment of the invention in one situation.

FIG. 3b shows the result in the network of deleting the node from FIG. 3a.

FIG. 3c is a diagram showing a node to be deleted in a network according to an embodiment of the invention in a different situation from that shown in FIG. 3a.

FIG. 3d shows adjustment and effect of deleting the node of FIG. 3c.

DESCRIPTION OF PREFERRED EMBODIMENTS

There are at least two aspects to the present invention. One aspect is assignment of identifiers to nodes in a serverless network, and another is use of hierarchical bitmaps for searching for free cells in a serverless network. Both aspects are fully developed below in enabling disclosure, beginning with the aspect of a method for assigning identifiers to nodes.

In various embodiments of the present invention the concept of a circle is used to define a set of numbers to which node identifiers must adhere. The bounding is based on the endless quality of a circle, such that points may be numbered from a beginning, or home point with a value of zero, in one direction (either cw or ccw) around the circle to return to a point immediately adjacent to the zero home point. The lower bound is inclusive at zero, and the upper bound is exclusive at 1, based on one rotation around the periphery of the circle, the exclusivity because zero and one are the same point.

In embodiments of the present invention the set of real numbers [0; 1) defines all of the numbers that may be used as identifiers. The set could as well be (0; 1], but the former notation is preferred. Once assigned, and if circumstances warrant the assigned numbers in the set can be converted easily into integers or into real numbers, belonging to any other interval.

Figure 1:
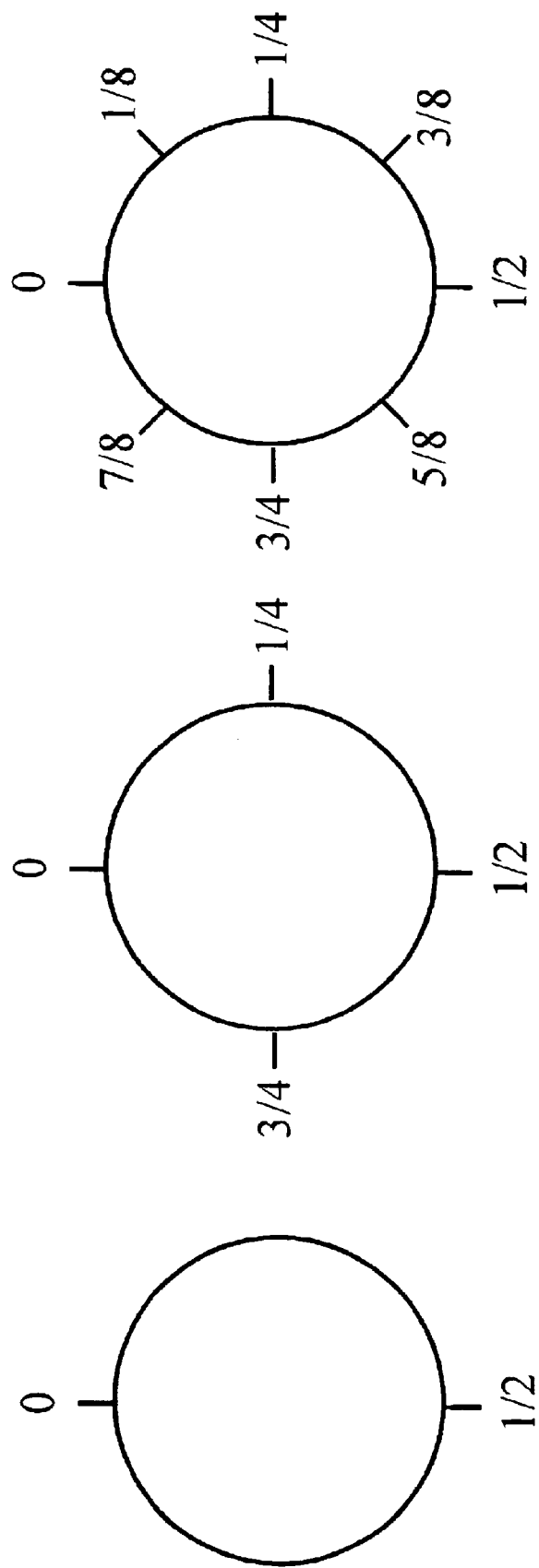
FIG. 1 is an illustration of allocation of identifiers for a serverless network in three different cases in an embodiment of the present invention.

In an embodiment of the invention, to assign identifiers for nodes, a circle is cut into number of sectors of equal length corresponding to the number of nodes in the network, with the point value at the end of any sector, being the fraction of one revolution represented by that point in the traverse of the circle, becoming the identifier for a node. FIG. 1 illustrates three circles with sectors and end-point identifiers for a network with 2, 4 and 8 nodes accordingly. If a network will consist of two nodes the circle is divided half-by-half (leftmost circle) and two points or boundaries of sectors are marked as 0 and ½. These numbers are then the node identifiers for two nodes.

If two more nodes join the network, then we shall divide each of the sectors half-by-half once again (middle circle) and have 4 sectors on which boundaries there are nodes with identifiers 0, ¼, ½ and ¾. If four more nodes enter the network (see rightmost circle) each sector is again divided by two making eight sectors on which boundaries there are nodes with identifiers 0, ⅛, ¼, ⅜, ½, ⅝, ¾ and ⅞.

Theoretically, if the network has seven nodes the circle may be divided into seven sectors with a length of 1/7 circumference each. In this case, the distribution of identifiers of nodes would be 1/7, 2/7, 3/7, 4/7, 5/7, and 6/7, ideally even. But with such an approach an addition of one more node would demand a change of length of all intervals between adjacent identifiers and, except for node zero would lead to a necessary replacement of all identifiers of nodes.

To avoid replacing all node identifiers with odd divisions, the criterion for uniformity of allocation is intentionally weakened to allow some intervals between adjacent identifiers to be twice shorter than the rest. At each stage of growth of a network the circle will be broken into $2^m$ long sectors where "m" is the maximum degree of the two, that is not exceeding the total number of nodes in the network.

Figure 2:
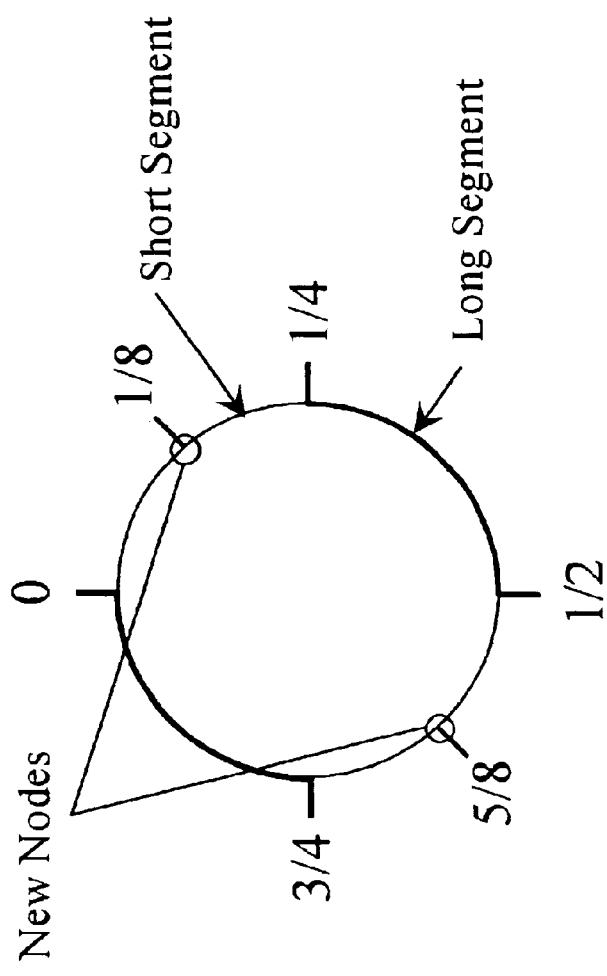
FIG. 2 is a diagram showing addition of and identifier assignment for two new nodes to a network already having four nodes, in an embodiment of the present invention.
Figure 2:
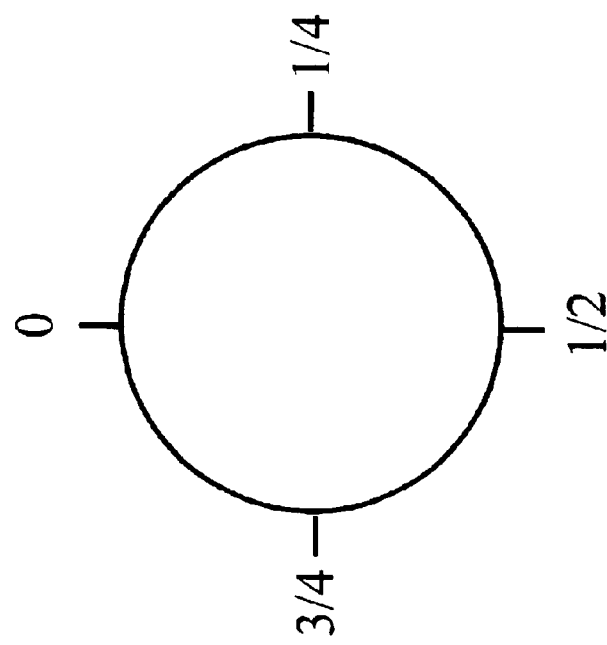

FIG. 2 illustrates a case of a network having four nodes shown with identifiers equally spaced on a circle, with values of 0, ¼, ½, and ¾ (leftmost circle). The sectors are all equal. Now two new nodes enter the network. Rather than re-dividing the circle into six equally-spaced sectors, two sectors are evenly divided (or halved) as shown in the rightmost circle, by adding two new points representing nodes, and taking the identifier values of ⅛ and ⅝. There are now four short segments and two long segments. If the number of nodes to be added is within $(n-2^m)$ this sort of division is done. When the number of nodes in a network becomes equal to $n=2^{(m+1)}$, then the circle will be evenly broken into short sectors. That is, if the network has four nodes, for example, as shown in the leftmost circle, and four nodes are to be added, then the circle will be split evenly into eight sectors for identifiers. The original nodes retain there identity whether two, three or four nodes are added, which is a criteria of the method.

In this embodiment of the invention constant non-uniformity (which is not dependent on "n") where length of the longest and shortest intervals between adjacent identifiers differs by no more than a factor of two, the statistical properties of the allocation necessary for proper operation of distributed hash-tables (DHT) in a peer-to-peer network is not broken. DHT requires that a length of the shortest and longest intervals would not differ more than in "c" times and that value "c" would not be function from n.

In operation of a network it is also necessary to delete nodes as well as add nodes. In the case of deleting a node, the node to be deleted has an identifier, and that identifier places the node on the circle at a particular point. If the node to be deleted is a demarcation between two short sectors, then the deletion will result in a new long sector, and the system preserves stability without having to change any node identities. But if a node to be deleted is at a boundary of a long sector, then deleting that node would cause a new sector unacceptably large.

FIG. 3a and FIG. 3b illustrate a situation where a node to be deleted has an identifier placing the node at a juncture between two short sectors. In this example there are six nodes 0, ⅛, ¼, ½, ⅝, and ¾. It is desired to remove node ⅛. FIG. 3b shows the result. The deletion simply makes a long sector between 0 and ¼, so there is no further change needed, and no nodes have to be moved to have new identifiers.

Figures 3C, 3D:
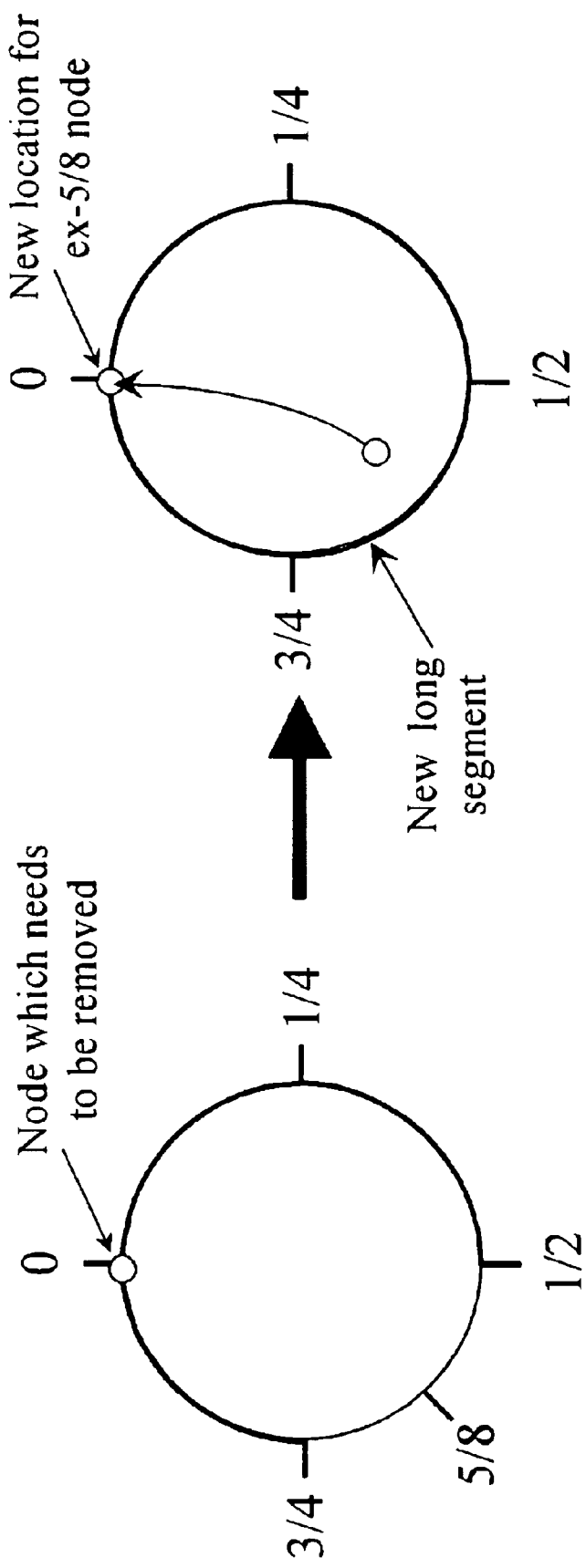

FIGS. 3c and 3d illustrate a situation where a node to be deleted is at a juncture of two long sectors, and deletion would create an unacceptably long sector. The node to be deleted is the 0 node. There are in this network topology three long sectors and two short sectors, and node ⅝ is at the middle juncture of the two short sectors. The solution is to remove the 0 node as desired, and move the ⅝ node to the 0 position (change its identifier to 0) as shown in FIG. 3d. This action creates a new long segment from ½ to ¾, and in the resulting topology there are four nodes equally spaced over four long sectors.

As described above, adding and deleting nodes and managing identifiers for the nodes within the bounded set takes place stage by stage. At each stage of addition of nodes the controlling circle is considered to be a set of long sectors which step-by-step, one by one, turn into short sectors by a way of bisection. When all long sectors are divided, the resulting set of short sectors makes a circle completely and evenly filled with identifiers. Then a new stage of splitting of sectors begins, and the sectors previously considered short sectors are now long sectors to be divided (halved) again. The inventors term each such stage of splitting as a round.

At each step in a round it is necessary to determine which sectors have already been divided, and which sectors have not. In an embodiment of the invention classical bitmaps are used in the process to keep track of the divided and undivided sectors. In this example a convention is accepted that a 0 value for a bit of a bitmap, the bit representing a long sector, means that the sector is not available to be divided (already divided), and a 1 value means that the sector has not been divided, that is, it is available to be divided to add a node identifier. The method deals with the free space of identifiers, rather than dealing with occupied identifiers.

Figure 4:
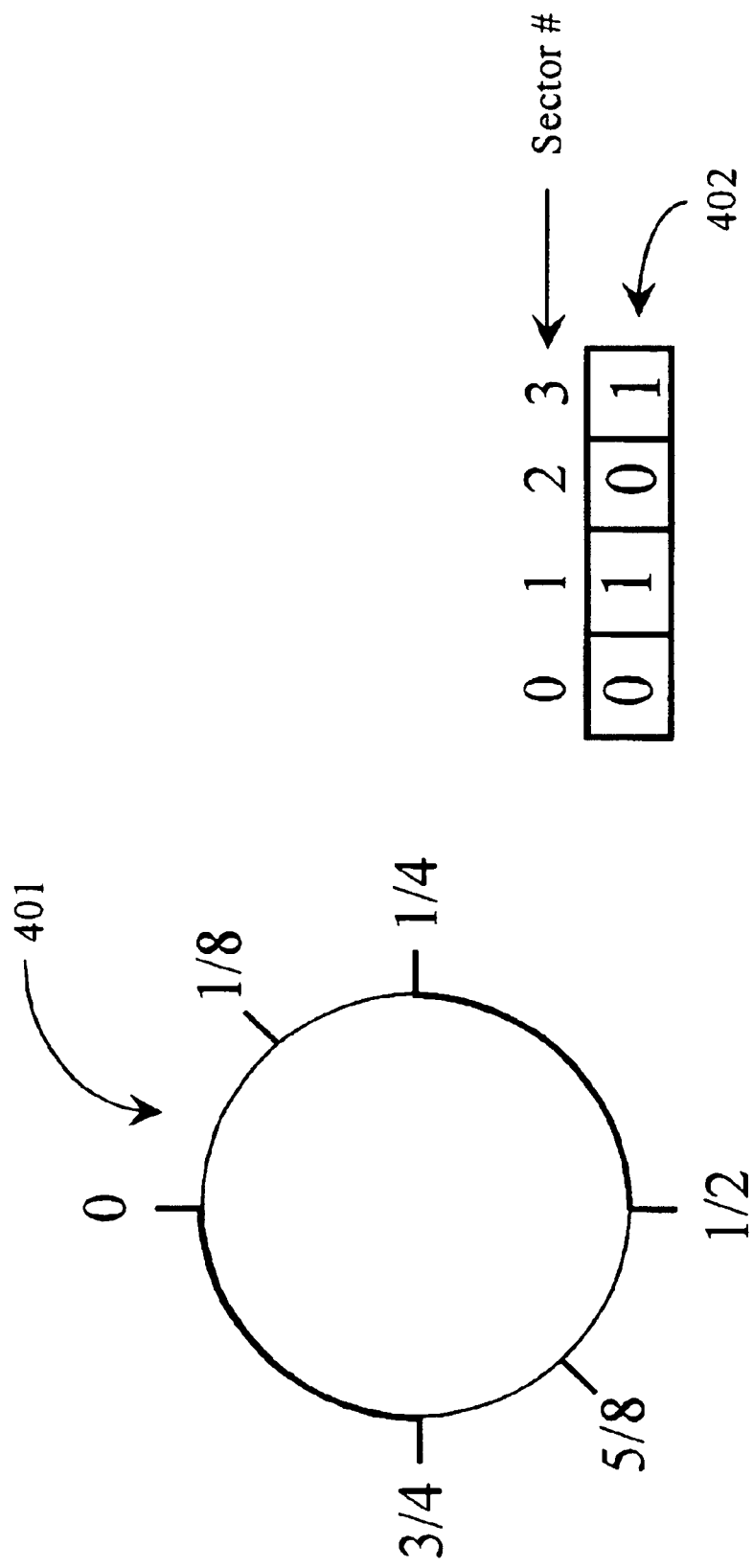
FIG. 4 shows a network and a bitmap representing the network in an embodiment of the invention.

FIG. 4 illustrates the concept of bitmap representation for networks and sectors. The circle representation for network nodes in embodiments of this invention can be considered to have an infinite number of sectors, and to have a workable system for assigning identifiers to new nodes and removing nodes from a network, there needs to be an identification system for sectors. The above descriptions should make it clear that sectors are defined by the end points, being the numerical value of the fraction of one complete rotation around the circle. A convenient notation for sectors then is simply a number in ascending order beginning at the zero node and proceeding clockwise by convention, beginning, as is common in binary systems, with zero rather than one.

By this convention, in a network with a single node the one existing node will have identifier 0. There is in this network at that point in time one sector, which runs from 0 (inclusive) all the way around the circle back to 0 (not inclusive). The sector number is also 0. In a network having two nodes, identified as 0 and ½ (see leftmost circle in FIG. 1), there are two sectors numbered 0 and 1, and so forth.

Now consider network 401 represented in FIG. 4, having six nodes with identifiers 0, ⅛, ¼, ½, ⅝, and ¾ shown on the circle representation. To have six nodes as shown, following our convention thus far, the network had to begin a splitting round, which would be the third splitting round (which will be identified as round 2, remembering the numbering convention 0, 1, 2, . . . ), with four nodes, because the third splitting round runs from four to eight nodes. At the beginning of the round there are four sectors numbered 0, 1, 2, and 3.

Bitmap 402 represents network 401 in the third round beginning with four nodes, therefore four sectors 0, 1, 2 and 3. The present state of network 401 in the current round is with six nodes, two having been added in this round and given identifiers ⅛ and ⅝, as shown. Bit map 404 therefore shows 0101, indicating that sector 0 and sector 2 have been divided to add new identifiers ⅛ and ⅝ thus far in the round, and the 1 and 3 sectors are available to be divided to use the ⅜ and ⅞ values as identifiers for new nodes.

"In the current round" is an important concept here, because the current round, in light of the present development of the network represented as having six nodes, there may only be up to 8 nodes. If two nodes are added to the network shown, and a ninth node is to be added, a new round begins (fourth round 3), wherein, at the beginning of the round there will be eight sectors (0, 1, 2, 3, 4, 5, 6, 7), and the representative bitmap will have eight bits, one for each sector, initially all bits "1".

Following this example it is clear that there will be many cases in which the system will need to assign a new node identifier as a node enters the network, and there will be a choice of several, or even many undivided sectors which may be selected to divide to add the wanted identifier. A convention and system for making such selections is described in enabling detail further below.

Similarly to the above, if nodes are to be deleted in any round, it is only those nodes which exist that can be deleted, and rounds are to be respected in deletion as well as well as addition of nodes. In deletion however, the system does not have the choice of which node is deleted. In an IP telephony system, for example, a member of the network (node) who disconnects triggers the deletion, and at the time of disconnect that node has an identifier in the system. The node's identifier must be either an end point of a long sector in the round, or a midpoint of a long sector in the round. If the identifier to be deleted is a midpoint of a long sector (for which the bit value is 0, indicating that sector is divided), the result of a deletion is a long sector then available to be divided in the current round, and there is no further action to be taken other than updating the current bitmap for the round, changing the bit value for the appropriate long sector from 0 to 1. If, on the other hand, the identifier to be deleted is an end point of a long sector for the round, then the resulting long sector will be unacceptably long, and something must be done. The solution is that described above with reference to FIGS. 3c and 3d. An identifier assigned to a node with a value representing a midpoint of a long sector must be re-identified. An existing node is selected that has a value representing the midpoint of a long sector, and that node is assigned a new identifier, which is the previous identifier for the node leaving the network, and its old identifier becomes available. Then the bitmap is updated showing the new topology.

The process described just above ensures that the numerical separation between any two node identifiers in any topography never be more than twice the separation between any other two nodes identifiers in the network.

In embodiments of the present invention all intelligence and management is accomplished on the network nodes, as there are no servers in the network for these processes. As an example, if the network is a telephony network and the actual nodes are computerized appliances capable of conducting telephony events on the network, then individual ones of the computerized appliances will have logic, typically software, and memory as well, to facilitate the network management.

If nodes are added to a network round after round until the controlling circle is broken into a very large number of sectors (for example on round twenty the circle will be broken on more than one million sectors), the bitmap representing the network will become too large to be stored in the memory of a single node. Another problem if one node stores and accomplishes the management logic is that in allocation of identifiers all new nodes would be forced to access the single and unique selected node-saver bitmap, and this would create a system bottleneck.

To avoid these potential difficulties, in many embodiments of the present invention the bitmap for any round is divided into a set of smaller fragments of identical length.

The length of a fragment could be arbitrary, but it is convenient to use a power of 2. A practical system implementation in one embodiment capable of managing relatively large networks may have a fragment length of thirty-two bits, for example. For the purposes of this specification, however, it is not necessary to describe a system with a fragment length as long as thirty-two bits. Examples to follow are described with a fragment length of four bits, which is adequate to describe the invention in an enabling fashion.

Following the convention of fragment length of four bits, on a first round (round 0) only one bit would be used, on a second round (round 1) two bits of a fragment would be used, on a third round (round 2) all of the four bits of a fragment, and on a fourth round (round 3) eight bits are needed, so the bitmap would have two four-bit fragments. On a fifth round the bitmap will be sixteen bits with four four-bit fragments.

Figure 5:
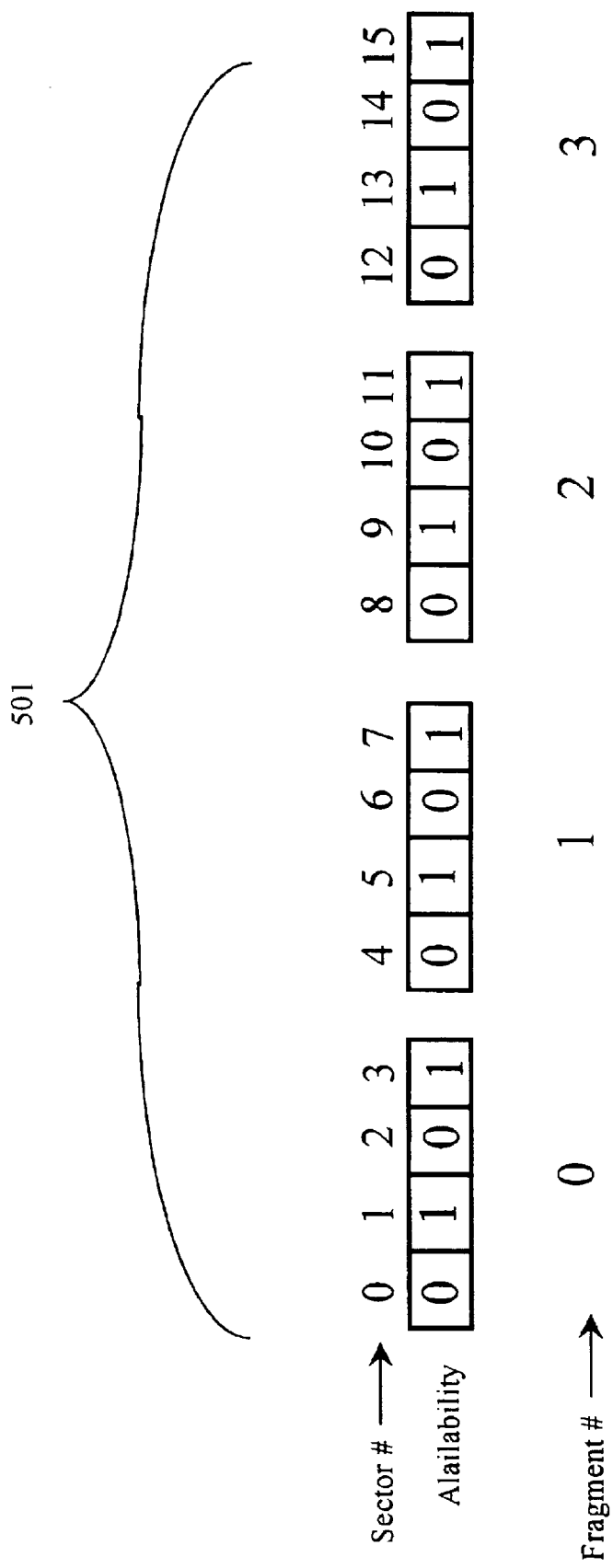
FIG. 5 illustrates a bitmap for a network somewhat more complicated than that shown in FIG. 4.

In an embodiment of the invention, in any round, each fragment is given a unique identifier which includes the number of its splitting round and a fragment number inside a complete bitmap for the given round. FIG. 5 illustrates this convention in an embodiment of the invention. FIG. 5 illustrates a bitmap of sixteen bits for network in a fifth splitting round. The round number is 4 for the fifth round, and the number of long sectors, therefore the number of bits in the bitmap is always 2 raised to the power of the round number, in this case $2^4=16$.

For the fragment number, any sector number of a fragment is divided by the round number (4), and the remainder is the ordered bit number in the fragment. For example, consider the rightmost fragment with sector numbers 12, 13, 14 and 15. 12/4=3, so this is fragment number 3, and there is no remainder in the division (R=0). The remainder in the division is the order of the sector bit in the fragment. Consider sector 15 in the same fragment. 15/4=3 (same fragment number), R=3, so the bit for sector 15 is the 3 bit (or fourth bit) in fragment 3.

There is yet more information to be read from the bitmap of FIG. 5 following these conventions. The values of the bits shown indicate that eight of the long sectors in this round have been divided, and eight are available to be divided. There are therefore 16+8=24 nodes in the network represented by these four fragments.

The problems of storing the entire bitmap at a single active node were described briefly above, and the representation of the overall bitmap as fragments of a conventional length allows different fragments to be stored on different nodes. Further the conventions adopted and described allow the fragments to be identified, so the distributed fragments can be checked for availability of node identifiers, or for deletion of node identifiers, and updated as nodes enter and leave the network.

Details of searching for a node containing a fragment of bitmap by its identifier, access to the found fragment for reading or writing, replication of the data for redundancy, and synchronous updating of all copies if a fragment of a bitmap is changed, is beyond the scope of this invention. These operations are simply manipulations using a lower level distributed system. For example, the distributed system with which identifiers are distributed can be used. The system can be, for example, a distributed hash-table. To avoid bottlenecks at the time of reading and writing of frequently-used fragments effective caching of the data is provided in many embodiments of the invention.

Thus a data structure is created which completely defines node identifiers in the system, which identifiers are distributed in the system at any point in time, and which identifiers are not distributed in the system, but are available to be allocated. This maintained by the complete description of all long sector states (divided or not divided) on all rounds of circle splitting.

Still, to allocate a new identifier on a current splitting round, it is necessary to search and quickly find an undivided long sector. Also, deleting a node and releasing its identifier in any round it may be necessary to search and quickly find a long sector already divided, so an identifier can be switched to maintain the viability of the network. In order to perform such searches effectively, two separate hierarchies of bitmaps are created and maintained, descending in size from the main bitmap.

Figure 6:
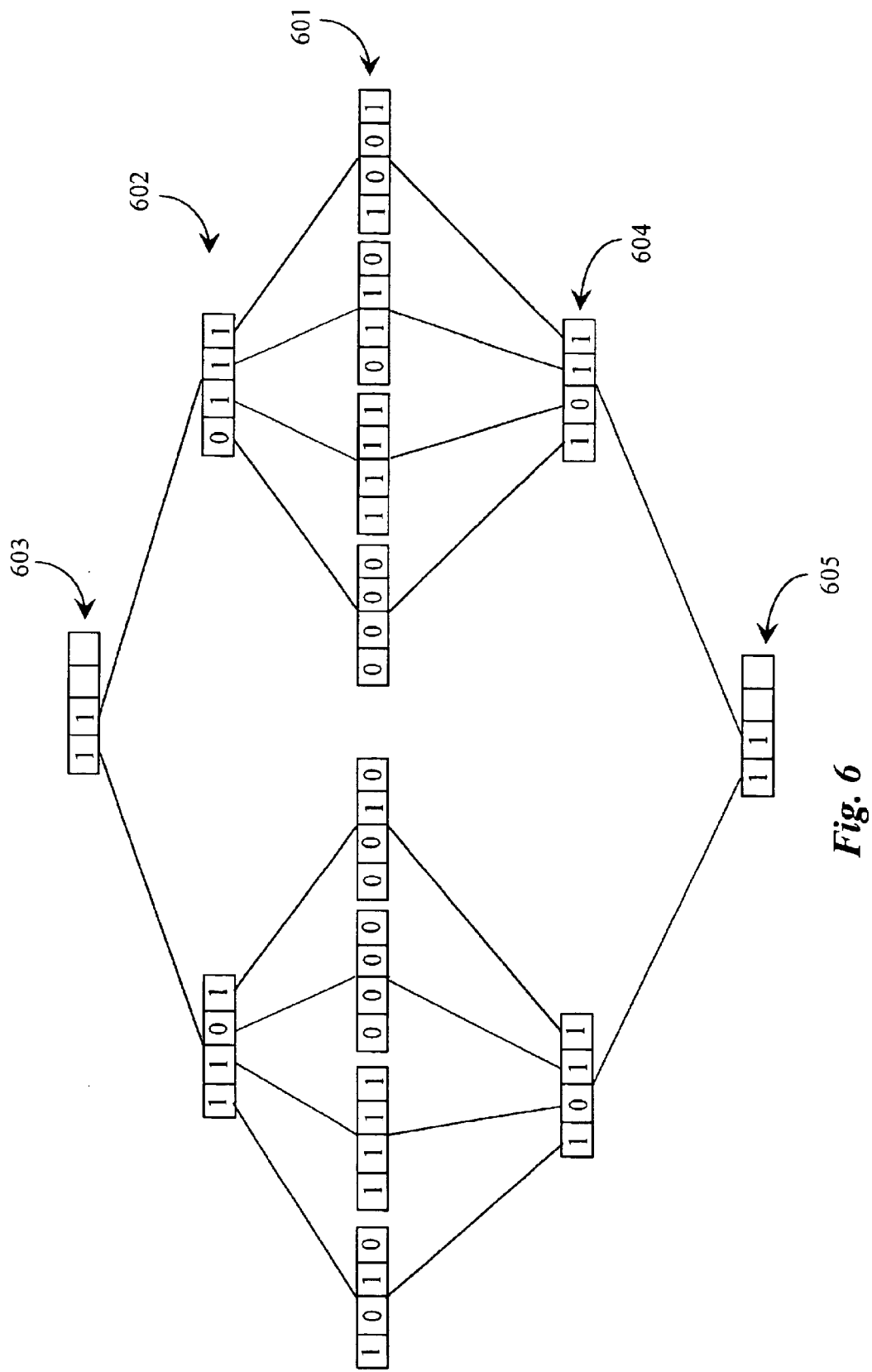
FIG. 6 illustrates a bitmap for a network and hierarchical bitmaps for searching in an embodiment of the invention.

FIG. 6 describes the hierarchies of bitmaps for effective searching. Bitmap 601 of eight four-bit fragments (32 bits) represents a network in a fifth splitting round. Although the sectors are not numbered and the fragments are not numbered, a left-to-right convention may be assumed, with sector numbers 0 to 31 left-to-right, and fragment numbers 0 to 7 left-to-right.

An eight-bit bit map 602 is shown above main bitmap 601 in two four-bit fragments. The leftmost fragment of bitmap 602 has four bits, each bit representing one fragment in the main bitmap as shown with connecting lines. The rightmost fragment of bitmap 602 has four bits, each bit representing one fragment in the main bitmap as also shown by connecting lines.

A 1 value for a bit in bitmap 602 represents that there is at least one sector in the associated fragment of the main bitmap which may be divided to assign a new identifier. A zero value for a bit in bitmap 602 means that the associated fragment in the main bitmap has no undivided sector, that all of the bits in the main bitmap fragment are zeros. Above bitmap 602 another bitmap 603 is created with a bit value for each fragment in bitmap 602 following the same convention. In this example there will be only two bits in the uppermost bitmap 603, because there are only two fragments in bitmap 602.

Now the search for long sectors that may be divided is considerably simplified. If a new node enters the network, the system enters bitmap 603, selects either of the 1 bits, descends to the associated fragment at the level of bitmap 602, selects any 1 bit, and descends again to the associated fragment in the main bitmap 601, selecting for division to assign the new identifier any sector with a 1 bit in that fragment of the main bitmap. After the new identifier is assigned, the bit for the sector in the main fragment is set to 0, the fragment is checked for 1's, and if none are found the associated bit of the fragment in bitmap 602 is set to 0, and so on. If the fragment in the main bitmap still has a 1 bit, then no updates are necessary at the level of bitmap 602 and 603.

In the addition of nodes and assignment of identifiers, when the top-level fragment, in this example 603, has only zeros, and the system has entered the bitmap hierarchy to assign a new identifier, then some housekeeping is necessary before a selection and assignment takes place. Firstly, the network is redefined with a new bitmap that is twice as large as the previous bitmap. The system at this point is entering a new splitting round. Also, new hierarchical bitmaps are established, and the hierarchy will be one level deeper.

In the same manner as described above for the hierarchy of bitmaps for searching for undivided long sectors as new nodes enter the network and new identifiers have to be assigned, a similar hierarchy is created for searching for divided long sectors in the process of releasing identifiers as nodes leave the network. FIG. 6 illustrates this hierarchy on the fifth round as bitmaps 604 and 605. In this case a 1 in an upper-level fragment indicates that the associated fragment at the lower level has at least one divided long sector, the midpoint of which is an identifier for an existing node.

If, on any round a node leaves the network, and that node bears an identifier that is the end point of an undivided long sector, such that the resulting sector will unacceptably long, then the system will enter the 605 bitmap, select a 1 and follow 1's to lower levels to find a node identifier to re-assign to maintain the integrity of the network. At the culmination of this process it is also necessary to update the bitmaps as needed before the next search.

Just as described above for entering a new splitting round when a new node enters the network, but there remain no long sectors to divide, when and if enough nodes leave the network and there are no divided sectors to move, then the system must transition to a lower-order round. The system in this process halves the number of fragments in the main bitmap, and rebuilds the hierarchical bitmaps to a shallower level by one.

Thus, if the length of a fragment in the system is equal to d, then a $\lceil \log_d n \rceil$ of bitmap levels (including the bitmap of an initial level) is created. For example, if the length of a fragment in a system is equal to 32, and number of nodes is equal to one million, then a total of 9 bitmaps (levels) will be needed for the last round of splitting: one main bitmap and two additional hierarchies, each of which contains 4 levels. A fragment's own length may also be used for each level of a hierarchy.

Let the sequential number of a current level in the hierarchy on which we are located be "l", the number of a fragment of bitmap is f, the fragment length is d, and the bit number in the current fragment is b, then the identifier of the fragment at the following level of hierarchy is:
Number of a level in hierarchy=l+1
Number of a fragment of bitmap=f*d+b If the number of a fragment of a bitmap is f, and the number of the current level in the hierarchy is 1, then the identifier of a fragment and number of a bit at the next higher level of hierarchy, which is responsible for the given fragment at current level is as follows:

$$\text{Number of a level in hierarchy} = l - 1$$

$$\text{Number of a fragment of bitmap} = \left\lfloor \frac{f}{d} \right\rfloor$$

$$\text{Number of a bit in the fragment} = f - d * \left\lfloor \frac{f}{d} \right\rfloor$$

Thus, the system can move upwards and downwards in the hierarchy.

With the help of hierarchical bitmaps, the free or used long sector may easily be found in a preferred embodiment using an algorithm described below. For that purpose it is needed to simply move downwards by levels of corresponding hierarchy and to analyze only one fragment of the base bitmap on the last step.

Maintenance of additional bitmaps consistent with the state of change of the base bitmap becomes a very simple process. For this purpose it is necessary to propagate information on full filling or full clearing of a fragment, and information about occurrence of an empty position in a fully filled fragment or the first used position in a fully clear fragment, upwards in the hierarchy. Thus the probability that a change of a fragment of a base bitmap will require a change at the top level of hierarchy decreases exponentially in the process of information propagation from the bottom level of the hierarchy to its root. This provides an opportunity for effective caching of information at a reading operation.

For uniform load distribution in a system comprising a large number of nodes, the descent to various bitmap levels may be implemented in a preferred embodiment of the invention in accordance with the following search procedure:

1. Search starts from the root of hierarchy.
2. On each step where ones are found in the current fragment of a bitmap, one of them is selected using random number generation, and the search path descends along the corresponding branch to the next level.
3. If a level is encountered where the fragment does not contain any one, or if a fragment of the main bitmap is reached, and no sector with the necessary characteristics is found (free or occupied—depending on what was being searched), it means that the last free sector has been divided, or the last occupied sector has been released. In this case, the system returns to the previous level, selects a different 1, and descends again by a different path.
4. If the system returns to the root of the hierarchy and finds there is no new 1, it means that the return was too late and a new splitting round has begun. In this case, the search operation on a new round is simply repeated.

In this process conflict situations and returns are improbable, and in any case, dealing with such conflicts does not lead to essential deceleration of system operation. The probability is that even in a highly loaded system, that is, in a rapidly changing network, probability of return to a previous level falls exponentially as the move from the main bitmap to the hierarchy core is implemented.

It should be noted that usage of such an algorithm with returns allows all the work to be done without need for special mutual exclusion of access to resources, to prevent conflict between sites changing bitmaps.

The above descriptions define a system, data structure, and procedures which to effectively manage the identifier space, to distribute in the space new identifiers and to release old, unnecessary identifiers. The distribution of these identifiers on a numerical axis is uniform. In this system the length of the longest interval between adjacent identifiers differs by no more than twice the length of the shortest interval. The hierarchical organization of bitmaps exponentially extinguishes probability of distribution of changes in structure from the bottom level of hierarchy to the root. The system as described makes possible an effective caching of information belonging to the top hierarchical levels. Acceleration of system performance and effective load distribution is provided over all network nodes. The search procedure, based on a random choice of bits in any situation extending a multiple choice, and using returns to upper levels in case of failure, provides effective randomization of distributed identifiers. Also, this procedure assures effective load distribution in a large network and operates without use of special tools for mutual exclusion at update of internal data structures. Further to the above, use of the procedure described, with returns, allows all work to be done without a need for a special resources for mutual exclusion to prevent conflict between sites when changing bitmaps.

The unique system and procedures described in enabling detail above in several embodiment of the invention provide effective operation in the space of identifiers, distributing in that space new identifiers and releasing no-longerneeded identifiers. In embodiments of the invention substantially uniform distribution of these identifiers on a numerical axis is provided, in that the separation of one identifier from an adjacent identifier can never be more than twice the separation of any other two identifiers adjacent identifiers in the system. Further, in embodiments of the invention hierarchical organisation of bitmaps exponentially extinguishes probability of distribution of changes in structure from the bottom level of hierarchy to the root. This makes possible an effective caching of the information that belongs to the top levels of hierarchy. A method of searching based on a random choice of bits and using returns to higher levels in case of failure provides effective randomization of distributed identifiers. Also, this method allows distribution of load in a larger network and operates without use of special tools for mutual exclusion at updating internal data structures.

In embodiments of the system described in enabling detail herein all tasks in network management are distributed over active nodes in the network, as well as all data necessary to manage the network, particularly that data pertaining to assigning identifiers to network nodes as such nodes enter the network and releasing identifiers as nodes leave the network.

It will be apparent to the skilled artisan that there are many variations that may be made in the embodiments described without departing from the spirit and scope of the invention. For example, the logic provided to network nodes for accomplishing the features of the invention in the several embodiments may be done in a variety of ways. It is notoriously well known that programmers and hardware developers can provide functional features in logic in a broad variety of ways. Moreover, network nodes in embodiments of the invention may take many different forms as computerized appliances. Networks may vary as well in many ways while still operating according to embodiments of the present invention. For these and other reasons the claims should be accorded the breadth of the claims below.

What is claimed is:

1. A method for assigning identifiers in a distributed system, comprising:
   (a) establishing a circle as a locus of all identifiers, with the value of any point on the circle being the portion of one complete revolution in a first direction around the circle to the point, measured from a first zero point; and
   (b) selecting values to be assigned as identifiers as needed by rounds of assignment, wherein, in any round of assignment, beginning with n equal-length sectors, termed long sectors, only the value of midpoints of long sectors are selected as new identifiers to be assigned in the system, each new assignment creating two new short sectors, the round continuing until all long sectors are divided, making the number of sectors at the end of the round, and the beginning of the next round 2n, and wherein the beginning and end of any round of assignment has identifiers assigned with point values that divide the circle into equal-length sectors.

2. The method of claim 1 wherein in every ascending new round of execution the short sectors at the end of the previous round are considered to be long sectors at the beginning of the next round, the number of sectors increasing in each round by a factor of two.

3. The method of claim 1 wherein identifiers may be withdrawn arbitrarily in any round as well as assigned, and if an identifier withdrawn is an endpoint of an undivided long sector, an already-assigned identifier in that round having a value of a midpoint of a long sector is reassigned using the value of the withdrawn identifier, freeing the previous midpoint value to be reused.

4. The method of claim 3 wherein if in any instant round withdrawal of an identifier will reduce the number of sectors below the beginning number of sectors for the round, a new descending round is entered wherein the long sectors of the instant round are considered short sectors of the descending round.

5. The method of claim 4 wherein a bitmap is used in any round for identifying, at any point in time, which long sectors are divided into short sectors by assignment of identifiers, and which are not yet divided, the number of bits in the bitmap equal to the number of long sectors in the round.

6. The method of claim 5 wherein the bitmap is divided into equal-length fragments, each fragment representing a group of adjacent sectors of the circle.

7. The method of claim 6 wherein the fragment length is a power of two.

8. The method of claim 6 wherein a hierarchy of bitmap fragments is established over the main bitmap, one bit in each upper-level bitmap representing a bitmap fragment in the next lower-level bitmap, wherein a one in a bit of an upper-level bit indicates either presence of at least one undivided sector or at least one divided sector represented in the associated lower-level fragment.

9. The method of claim 8 wherein the hierarchy of bitmaps is used to select sectors to divide to provide values for assignment as identifiers or assigned values to be re-assigned.

10. The method of claim 5 wherein the bitmap is consulted in selecting sectors for assigning and reassigning identifiers.

11. A distributed, serverless system comprising:
    a plurality of computerized appliances as active and inactive nodes in the serverless system;
    a communication facility interconnecting individual ones of the plurality of computerized appliances; and
    an assignment system for assigning and re-assigning identifiers to nodes of the serverless system;
    wherein the assignment system establishes a circle as a locus of all identifiers, with the value of any point on the circle being the portion of one complete revolution in a first direction around the circle to the point, measured from a first zero point, and selects values to be assigned as identifiers as needed by successive rounds of assignment, wherein, in any round of assignment, beginning with n equal-length sectors, termed long sectors, only the value of midpoints of long sectors are selected as new identifiers to be assigned in the system, each new assignment creating two new short sectors, the round continuing until all long sectors are divided, making the number of sectors at the end of the round, and the beginning of the next round 2n, and wherein the beginning and end of any round of assignment has identifiers assigned with point values that divide the circle into equal-length sectors.

12. The distributed system of claim 11 wherein in every ascending new round of execution the short sectors at the end of the previous round are considered to be long sectors at the beginning of the next round, the number of sectors increasing in each round by a factor of two.

13. The distributed system of claim 11 wherein identifiers may be withdrawn arbitrarily in any round as well as assigned, and if an identifier withdrawn is an endpoint of an undivided long sector, an already-assigned identifier in that round having a value of a midpoint of a long sector is reassigned using the value of the withdrawn identifier, freeing the previous midpoint value to be reused.

14. The distributed system of claim 13 wherein if in any instant round withdrawal of an identifier will reduce the number of sectors below the beginning number of sectors for the round, a new descending round is entered wherein the long sectors of the instant round are considered short sectors of the descending round.

15. The distributed system of claim 14 wherein a bitmap is used in any round for identifying, at any point in time, which long sectors are divided into short sectors by assignment of identifiers, and which are not, the number of bits in the bitmap equal to the number of long sectors in the round.

16. The distributed system of claim 15 wherein the bitmap is divided into equal-length fragments, each fragment representing a group of adjacent sectors of the circle.

17. The distributed system of claim 16 wherein the fragment length is a power of two.

18. The method of claim 16 wherein a hierarchy of bitmap fragments is established over the main bitmap, one bit in each upper-level bitmap representing a bitmap fragment in the next lower-level bitmap, wherein a one in a bit of an upper-level bit indicates either presence of at least one undivided sector or at least one divided sector represented in the associated lower-level fragment.

19. The method of claim 18 wherein the hierarchy of bitmaps is used to select sectors to divide to provide values for assignment as identifiers or assigned values to be re-assigned.

20. The distributed system of claim 15 wherein the bitmap is consulted in selecting sectors for assigning and reassigning identifiers.

* * * * *